(12) United States Patent
Chuang et al.

(10) Patent No.: US 8,369,076 B2
(45) Date of Patent: Feb. 5, 2013

(54) ELECTRONIC DEVICE AND MOVING MECHANISM THEREOF

(75) Inventors: I-Cheng Chuang, Taoyuan County (TW); Ying-Xing Lee, Taoyuan County (TW); Chien-Wei Huang, Taoyuan County (TW); Ying-Yen Cheng, Taoyuan County (TW); Ying-Hao Yeh, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 462 days.

(21) Appl. No.: 12/638,447

(22) Filed: Dec. 15, 2009

(65) Prior Publication Data

US 2010/0321866 A1    Dec. 23, 2010

(30) Foreign Application Priority Data

Jun. 23, 2009   (TW) ................................ 98120979 A

(51) Int. Cl.
*H05K 5/00* (2006.01)
*H05K 7/00* (2006.01)
*H04M 1/00* (2006.01)

(52) U.S. Cl. ........... 361/679.27; 361/679.26; 361/679.3; 361/679.55; 361/679.56; 455/575.1; 455/575.3; 455/575.4

(58) Field of Classification Search ............. 361/679.09, 361/679.26, 679.27, 679.3, 679.56, 679.55; 455/575.3, 575.4, 575.1
See application file for complete search history.

(56) References Cited

U.S. PATENT DOCUMENTS

| | | | |
|---|---|---|---|
| 7,583,496 B2 * | 9/2009 | Lai | .............................. 361/679.3 |
| 2007/0252202 A1 | 11/2007 | Park et al. | |
| 2008/0081505 A1 | 4/2008 | Ou et al. | |
| 2008/0304217 A1 | 12/2008 | Lai et al. | |
| 2009/0009949 A1 * | 1/2009 | Lai et al. | ........................ 361/681 |

FOREIGN PATENT DOCUMENTS

| | | |
|---|---|---|
| CN | 101101018 A | 1/2008 |
| CN | 101335772 A | 12/2008 |
| EP | 2012506 A2 | 1/2009 |
| TW | 2007-23874 | 6/2007 |

* cited by examiner

*Primary Examiner* — Anthony Haughton
(74) *Attorney, Agent, or Firm* — Birch, Stewart, Kolasch & Birch, LLP

(57) ABSTRACT

A moving mechanism is provided, including a torsion hinge, a slider, a lock member, and an elastic member disposed on the slider. The torsion hinge has a first plate and a second plate rotatable relative to each other. The lock member is rotatable relative to the first plate, and the slider is movably disposed on the second plate. When the moving mechanism is in a closed state, the lock member is engaged with a slot portion of the second plate, so as to restrict the second plate in a predetermined angle. When the slider slides relative to the second plate to a critical position, the elastic member pushes the lock member to release from the slot portion, such that the second plate is rotatable to an open position.

20 Claims, 6 Drawing Sheets

ELECTRONIC DEVICE AND MOVING MECHANISM THEREOF

CROSS REFERENCE TO RELATED APPLICATIONS

This application claims priority of Taiwan Patent Application No. 098120979, filed on Jun. 23, 2009, the entirety of which is incorporated by reference herein.

BACKGROUND OF THE INVENTION

1. Field of the Invention

This application relates in general to an electronic device and in particular to an electronic device including a moving mechanism.

2. Description of the Related Art

Referring to FIG. 1, a conventional sliding-type mobile phone includes an input module 100 and a display module 200 reciprocally movable with respect to each other (as the arrows indicate in FIG. 1), wherein the input module 100 includes a keypad 110, and the display module 200 includes a screen 210.

In the conventional sliding-type mobile phone, the input module 100 and the display module 200 are movably connected by a sliding mechanism with a torsion hinge. When the display module 200 slides to a critical position relative to the input module 100, the torsion hinge can provides a spring force to rotate the display module 200 upwardly, as shown in FIG. 2, so that the display module 200 is angled with respect to the input module 100 for convenient usage.

When returning the display module 200 to a closed state, the display module 200 is pushed toward the input module 100, as the arrow D1 indicates in FIG. 3, and the display module 200 is horizontally impelled along the upper surface of the input module 100, as the arrow D2 indicates in FIG. 3. Hence, the display module 200 can be moved to a closed position, as shown in FIG. 4.

In FIG. 3, the torsion hinge H has a first plate H1 and a second plate H2 respectively connecting to the input module 100 and the display module 200. The torsion hinge H can provide a preloaded spring force F to rotate the display module 200 upwardly. However, the preloaded spring force F may adversely cause a gap G between the input module 100 and the display module 200 when in the closed state, as shown in FIGS. 3 and 4. The gap G can cause disfigurement in unity of appearance of the mobile phone and cause mechanical failure of the torsion hinge H and the sliding mechanism following repeated operations.

BRIEF SUMMARY OF INVENTION

The application provides a moving mechanism including a torsion hinge, a slider, a lock member, and an elastic member disposed on the slider. The torsion hinge has a first plate and a second plate rotatable relative to each other. The lock member is rotatable relative to the first plate, and the slider is movably disposed on the second plate. When the moving mechanism is in a closed state, the lock member is engaged with a slot portion of the second plate, so as to restrict the second plate in a predetermined angle. When the slider slides relative to the second plate to a critical position, the elastic member pushes the lock member to release from the slot portion, such that the second plate is rotatable to an open position.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 5:
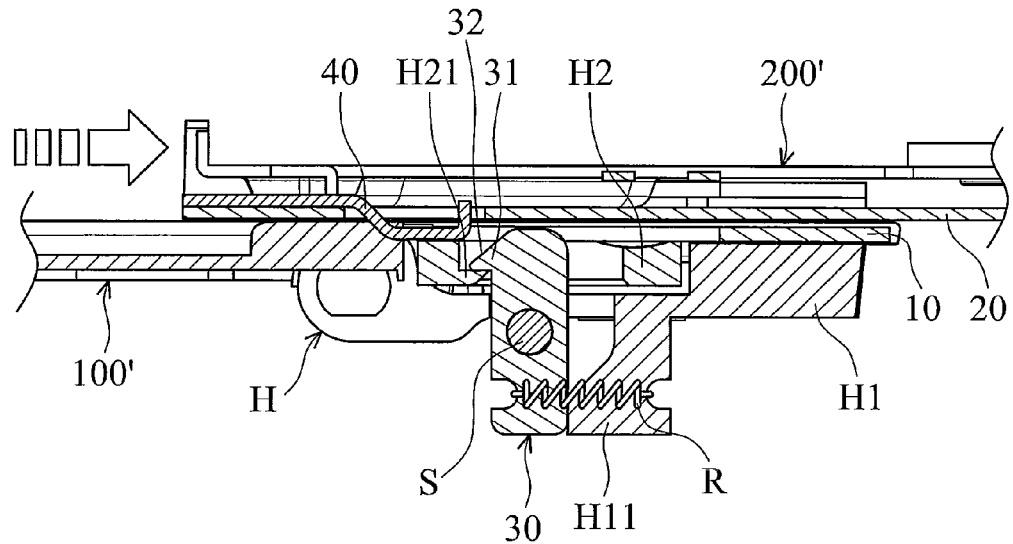
FIG. 5 is a perspective diagram of a moving mechanism according to an embodiment of the invention.

Referring to FIG. 5, an embodiment of a moving mechanism is disposed in an electronic device to movably connect an input module 100' with a display module 200'. To simplify drawing complex objects, only parts of the input module 100' and the display module 200' are shown.

In FIG. 5, the moving mechanism primarily includes a torsion hinge H, a fixed member 10, a slider 20, a lock member 30, and an elastic member 40. The torsion hinge H includes a first plate H1 mounted on the input module 100' and a second plate H2 automatically rotatable relative to the first plate H1. Furthermore, the fixed member 10 is fixed to the second plate H2, and the slider 20 is movably disposed on the fixed member 10, as the arrow indicates in FIG. 5.

As described above, the moving mechanism of the application is provided to connect the input module 100' and the display module 200', such that the display module 200' is slidable and rotatable relative to the input module 100' to adjust posture of the electronic device. In some embodiments, the electronic device may be a mobile phone, PDA, pocket PC, Ultra-Mobile PC (UMPC), or tablet PC.

Figure 1:
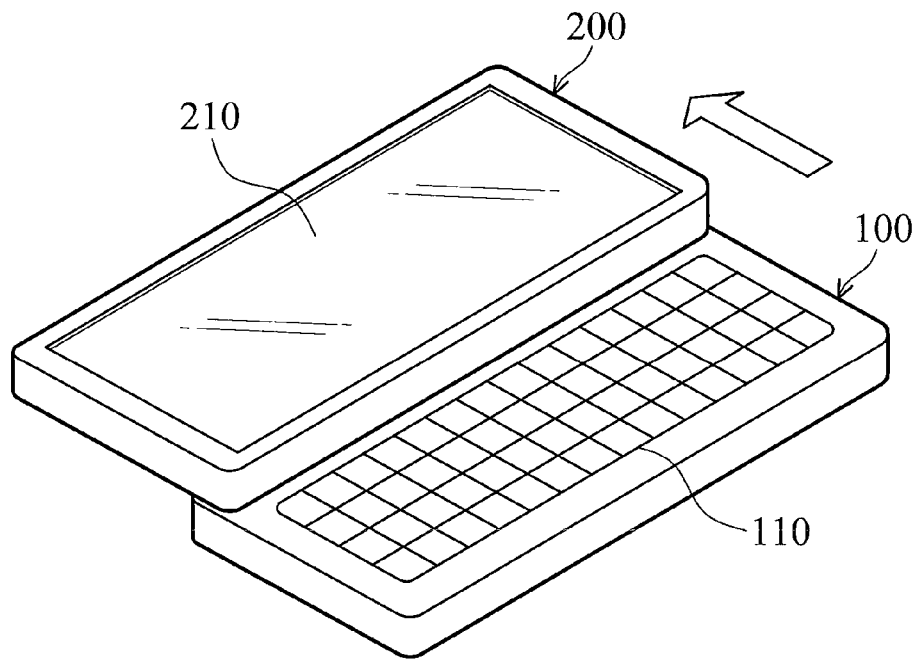
FIGS. 1-4 are perspective diagrams of a conventional sliding-type electronic device.
Figure 2:
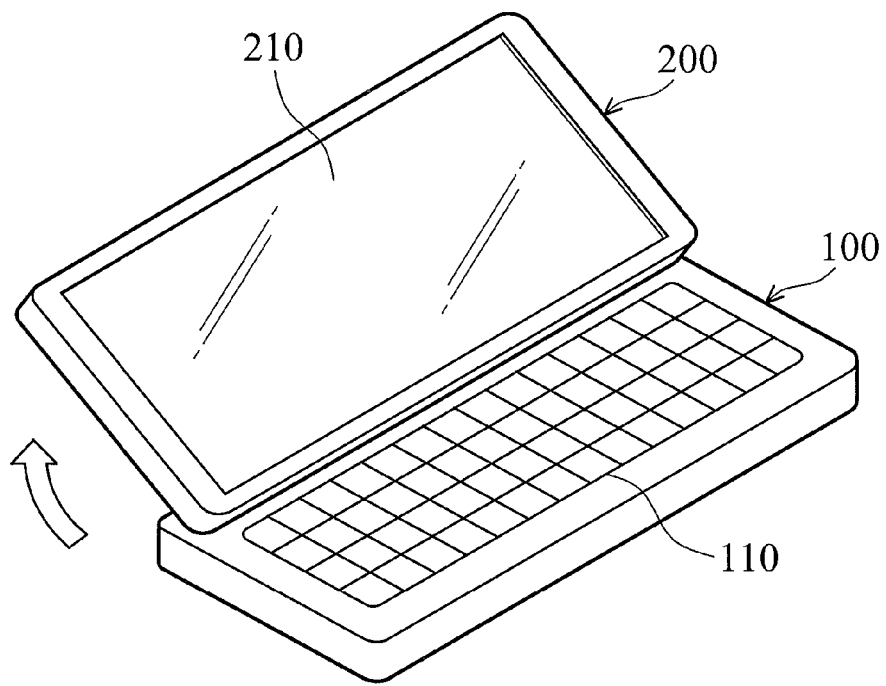
Figure 3:
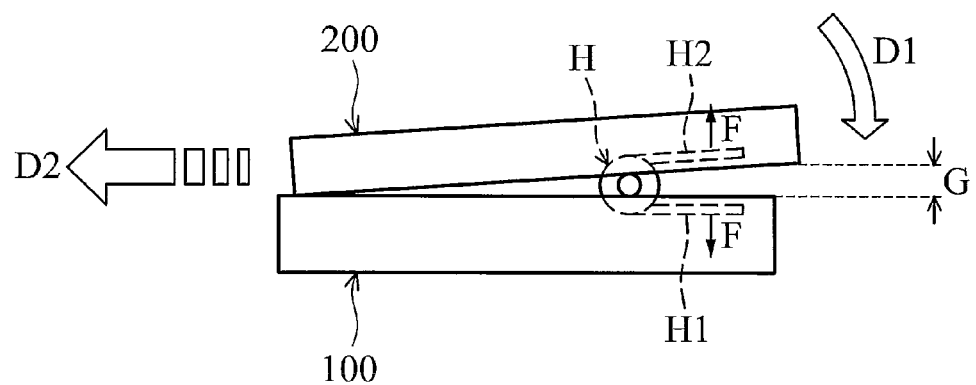
Figure 4:
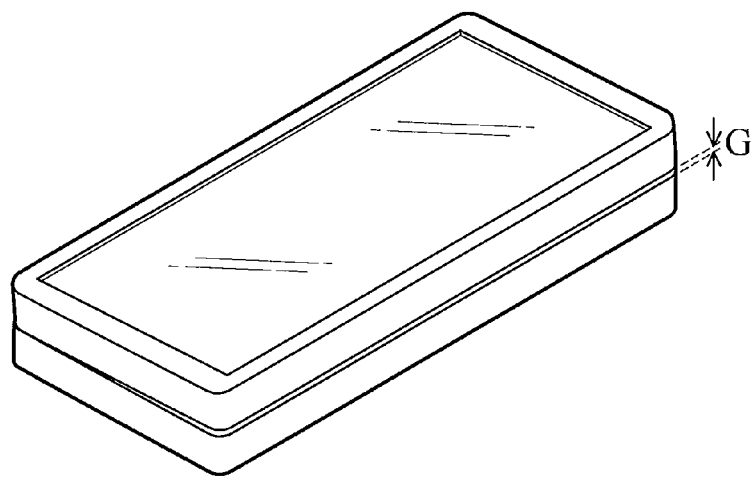

The lock member 30 and the first plate H1 of FIG. 5 are pivotally connected via a hinge S. Additionally, the lock member 30 and the first plate H1 are connected via an elastic component R. When the input module 100' and the display module 200' are situated in a closed state, the lock member 30 is in an initial position and contacts an end portion H11 of the first plate H1, wherein a hook 31 of the lock member 30 is engaged with a slot portion H21 of the second plate H2, thus restricting the second plate H2 at a predetermined angle. Hence, the second plate H2 is prohibited from upward rotation relative to the first plate H1, and the gap G as shown in FIGS. 3 and 4 can be suppressed.

Figure 6:
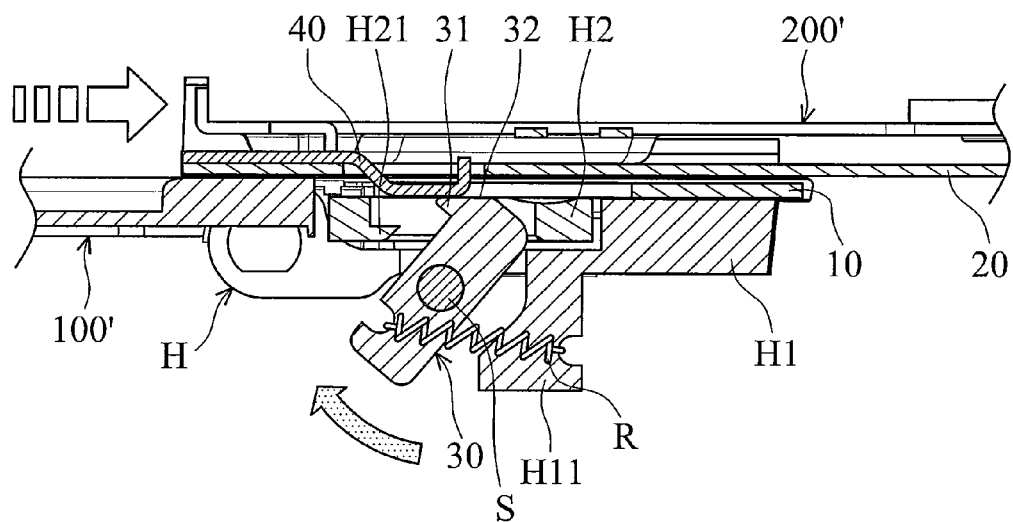
FIG. 6 is a perspective diagram of an elastic member pushing a lock member rotating according to an embodiment of the invention.

Referring to FIG. 6, when a horizontal force is exerted on the display module 200', the slider 20 is moved rightward relative to the fixed member 10, so as to switch the electronic device from the closed state to an open state. When the slider 20 moves relative to the fixed member 10 to a critical position, as shown in FIG. 6, the elastic member 40 pushes against a slope 32 of the lock member 30, so that the lock member 30 is rotated around the hinge S clockwise to separate the hook 31 from the slot portion H21.

Figure 7:
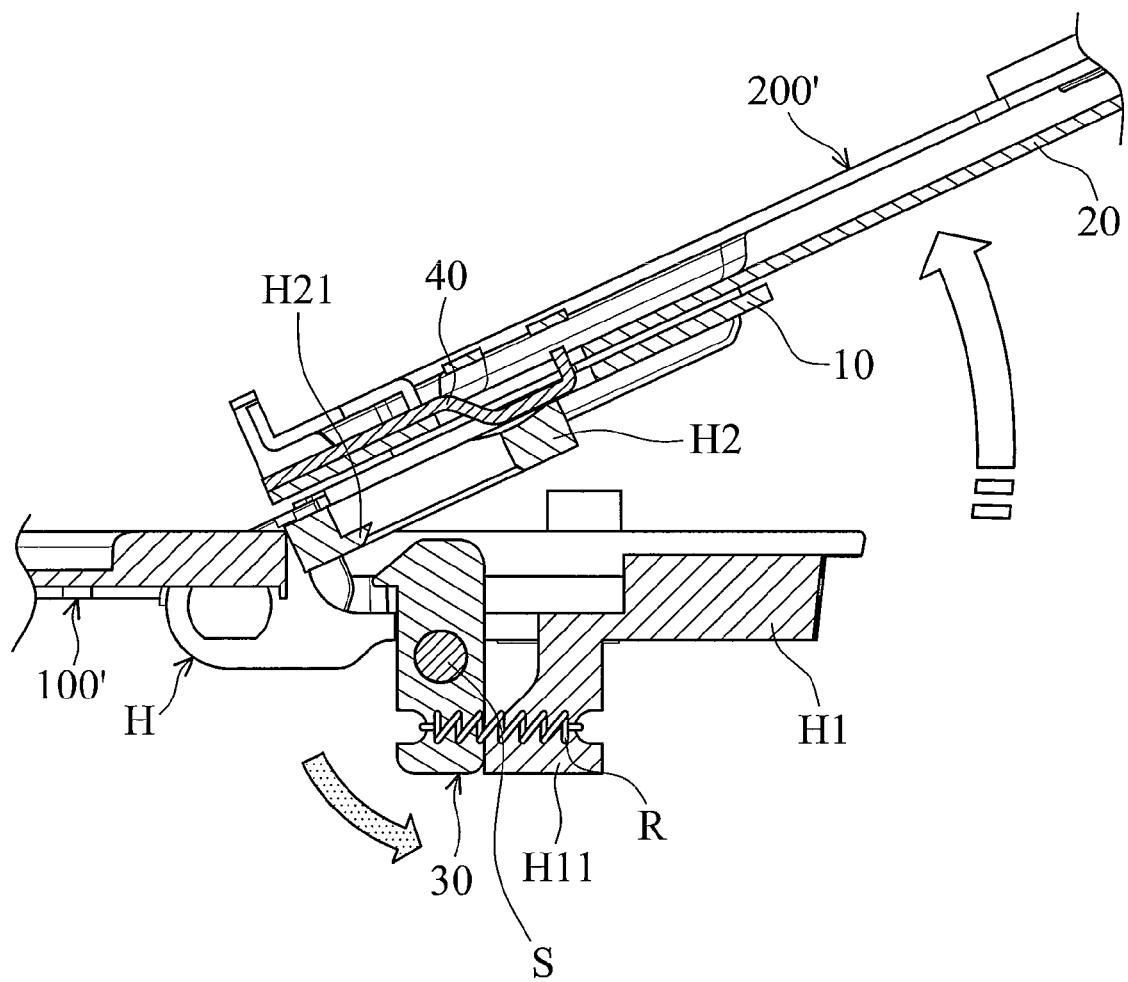
FIG. 7 is a perspective diagram of a second plate of a torsion hinge rotating relative to a first plate of the torsion hinge according to an embodiment of the invention.

With the hook 31 separated from the slot portion H21, the second plate H2 and the fixed member 10 are automatically released from the predetermined angle and rotate upwardly to an open position relative to the first plate H1, as shown in FIG. 7. Meanwhile, the hook 31 can automatically return to the initial position by elastic force of the elastic component R.

Figure 8:
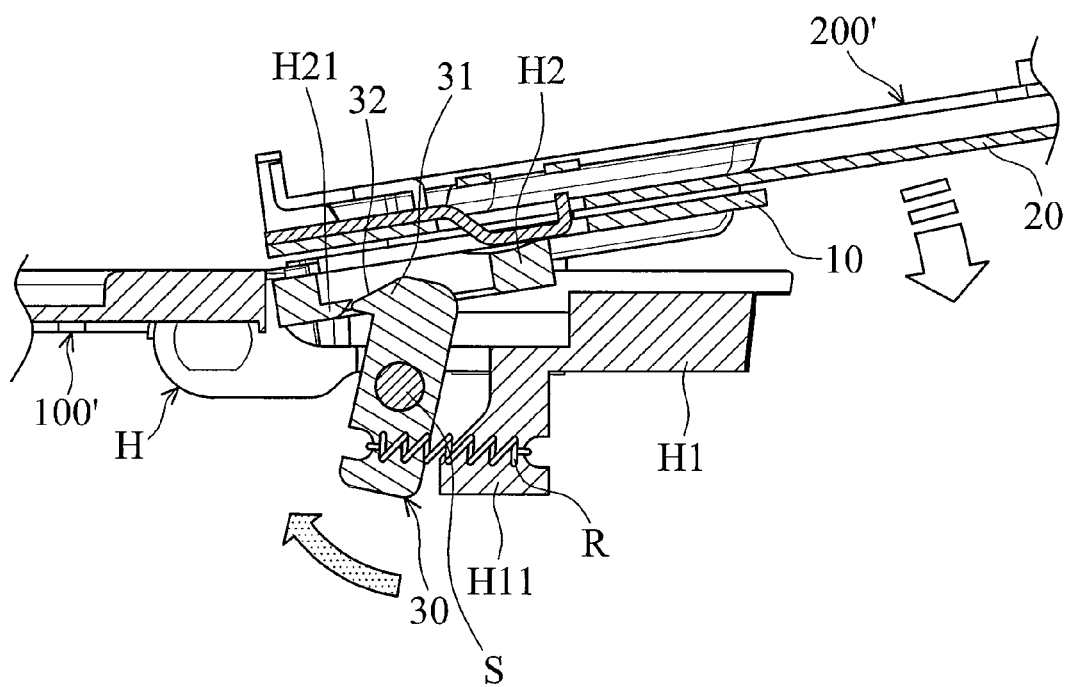
FIG. 8 is a perspective diagram of a slot portion of a second plate pushing a lock member rotating according to an embodiment of the invention.
Figure 9:
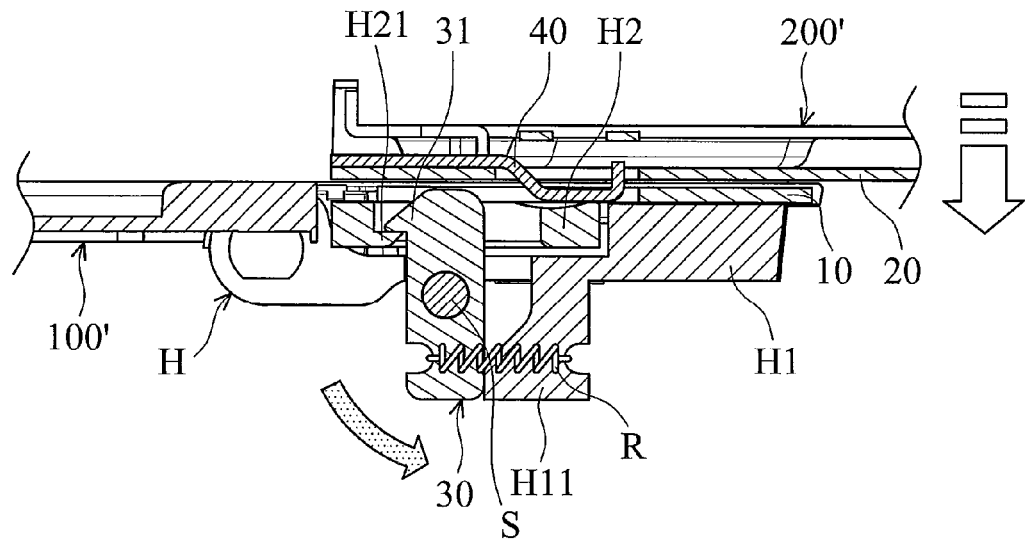
FIG. 9 is a perspective diagram of a hook of a lock member engaged with a slot portion of a second plate according to an embodiment of the invention.

Referring FIG. 8, when returning the electronic device to the closed state, an external force is exerted on the display module 200' toward the input module 100'. Hence, the slider 20, the fixed member 10, and the second plate H2 are rotated toward the input module 100', as the arrow indicates in FIG. 8. During downward rotation of the second plate H2, the slot portion H21 contacts the slope 32 of the lock member 30 and forces the lock member 30 rotating clockwise around the hinge S. While the second plate H2 returns to the predetermined angle, the lock member 30 rotates to the initial position by elastic force of the elastic component R, as shown in FIG. 9. Hence, the hook 31 is engaged with the slot portion H21 again, to restrict the second plate H21 in the predetermined angle.

Figure 10:
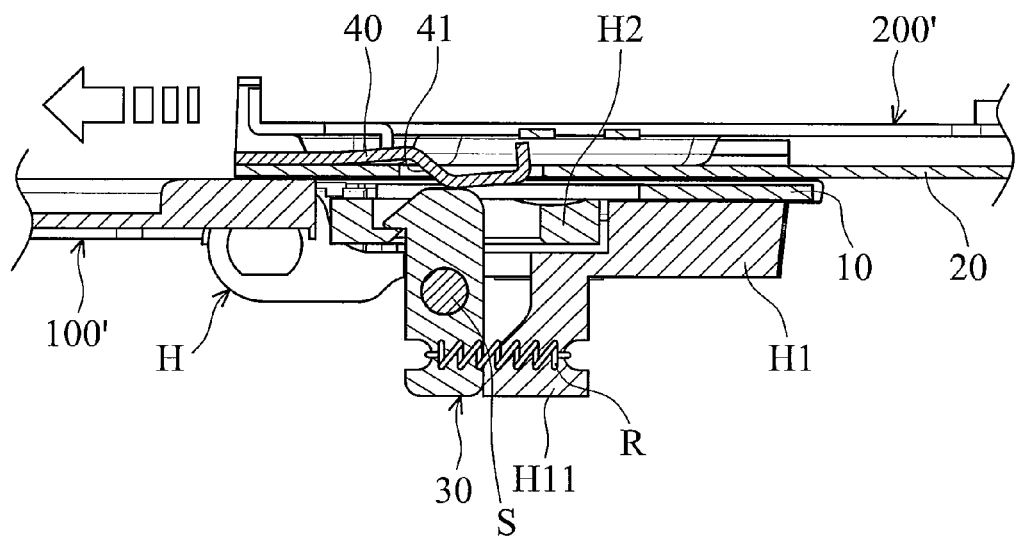
FIG. 10 is a perspective diagram of an elastic member which is slightly deformed when contacting a lock member according to an embodiment of the invention.

Referring to FIG. 10, after the second plate h2 returns to the predetermined angle, the display module 200' is pushed to the left, and the slider 20 is moved leftward along the second plate H2. During leftward motion of the slider 20, a contact surface 41 of the elastic member 40 contacts the lock member 30. As shown in FIG. 10, the elastic member 40 is slightly deformed upwardly and slides across the upper surface of the lock member 30. With the display module 200' and the slider 20 moved to the left, the electronic device is returned to the closed state.

In this embodiment, the elastic member 40 is a metal sheet which has a spoon-shaped structure. Additionally, the elastic component R may be a coil spring forcing the lock member 30 to contact the end portion H11 of the first plate H1 when in the initial position. In some embodiments, the hinge S may be a torsion hinge which impels the hook 31 of the lock member 30 to engage with the slot portion H21 of the second plate H2. In some embodiments, the elastic component R can be omitted from the moving mechanism when the hinge S is a torsion hinge.

The application provides a moving mechanism movably connecting an input module 100' and a display module 200' of an electronic device. The second plate H2 is prohibited from rotation relative to the first plate H1 by a hook 31 of the lock member 30 engaging with a slot portion H21 of the second plate H2. Hence, the gap G shown in FIG. 4 can be suppressed. Additionally, the application prevents disfigurement in unity of appearance and mechanical failure following repeated operations, thus extending usage life.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A moving mechanism connecting a display module and an input module of an electronic device, comprising:
a torsion hinge, having a first plate disposed on the input module and a second plate rotatable relative to the first plate, wherein the second plate has a slot portion;
a fixed member, mounted on the second plate;
a slider, fixed to the display module and slidable relative to the fixed member;
a lock member, rotatable relative to the first plate and disposed inside the input module, wherein when the moving mechanism is in a closed state, the lock member is in an initial position and engaged with the slot portion of the second plate to restrict the second plate in a predetermined angle; and
an elastic member disposed on the slider, wherein when the slider moves relative to the fixed member to a critical position, the elastic member protrudes into the input module and pushes the lock member to release from the slot portion, such that the second plate is rotatable relative to the first plate to an open position.

2. The moving mechanism as claimed in claim 1, wherein the lock member has a slope, and when the slider moves relative to the fixed member to the critical position, the elastic member pushes the lock member rotating relative to the first plate.

3. The moving mechanism as claimed in claim 2, wherein when the second plate rotates relative to the first plate from the open position toward the first plate, the slot portion contacts the slope and pushes the lock member rotating relative to the first plate.

4. The moving mechanism as claimed in claim 1, wherein the moving mechanism further comprises an elastic component connecting the lock member and the first plate.

5. The moving mechanism as claimed in claim 4, wherein when the second plate rotates relative to the first plate to the open position, the elastic component exerts an elastic force on the lock member, such that the lock member returns to the initial position.

6. The moving mechanism as claimed in claim 4, wherein the lock member abuts the first plate when in the initial position.

7. The moving mechanism as claimed in claim 4, wherein the elastic component comprises a coil spring.

8. The moving mechanism as claimed in claim 1, wherein the lock member has a hook engaged with the slot portion when the moving mechanism is in a closed state.

9. The moving mechanism as claimed in claim 1, wherein the elastic member has a spoon-shaped structure.

10. The moving mechanism as claimed in claim 1, wherein the elastic member comprises metal.

11. An electronic device, comprising:
a display module;
an input module;
a moving mechanism, comprising:
a torsion hinge, having a first plate disposed on the input module and a second plate rotatable relative to the first plate, wherein the second plate has a slot portion;
a fixed member, mounted on the second plate;
a slider, fixed to the display module and slidable relative to the fixed member;
a lock member, rotatable relative to the first plate and disposed inside the input module, wherein when the moving mechanism is in a closed state, the lock member is in an initial position and engaged with the slot portion of the second plate to restrict the second plate in a predetermined angle; and
an elastic member disposed on the slider, wherein when the slider moves relative to the fixed member to a critical position, the elastic member protrudes into the input module and pushes the lock member to release from the slot portion, such that the second plate is rotatable relative to the first plate to an open position.

12. The moving mechanism as claimed in claim 11, wherein the lock member has a slope, and when the slider moves relative to the fixed member to the critical position, the elastic member pushes the lock member rotating relative to the first plate.

13. The moving mechanism as claimed in claim 12, wherein when the second plate rotates relative to the first plate from the open position toward the first plate, the slot portion contacts the slope and pushes the lock member rotating relative to the first plate.

14. The moving mechanism as claimed in claim 11, wherein the moving mechanism further comprises an elastic component connecting the lock member and the first plate.

15. The moving mechanism as claimed in claim 14, wherein when the second plate rotates relative to the first plate to the open position, the elastic component exerts an elastic force on the lock member, such that the lock member returns to the initial position.

16. The moving mechanism as claimed in claim 14, wherein the lock member abuts the first plate when in the initial position.

17. The moving mechanism as claimed in claim 14, wherein the elastic component comprises a coil spring.

18. The moving mechanism as claimed in claim 11, wherein the lock member has a hook engaged with the slot portion when the moving mechanism is in a closed state.

19. The moving mechanism as claimed in claim 11, wherein the elastic member has a spoon-shaped structure.

20. The moving mechanism as claimed in claim 11, wherein the elastic member comprises metal.

\* \* \* \* \*